United States Patent
Pronin et al.

(10) Patent No.: US 9,318,867 B2
(45) Date of Patent: Apr. 19, 2016

(54) LASER DEVICE WITH KERR EFFECT BASED MODE-LOCKING AND OPERATION THEREOF

(75) Inventors: Oleg Pronin, Garching (DE); Ferenc Krausz, Garching (DE); Alexander Apolonskiy, Garching (DE); Jonathan Brons, Unterschleissheim (DE)

(73) Assignees: Max-Planck-Gesellschaft zur Foerderung der Wissenschaften e.V., Muenchen (DE); Ludwig-Maximilians-Universitaet Muenchen, Muenchen (DE)

( * ) Notice: Subject to any disclaimer, the term of this patent is extended or adjusted under 35 U.S.C. 154(b) by 0 days.

(21) Appl. No.: 14/350,355

(22) PCT Filed: Oct. 7, 2011

(86) PCT No.: PCT/EP2011/005023
§ 371 (c)(1),
(2), (4) Date: Apr. 7, 2014

(87) PCT Pub. No.: WO2013/050054
PCT Pub. Date: Apr. 11, 2013

(65) Prior Publication Data
US 2014/0286364 A1 Sep. 25, 2014

(51) Int. Cl.
*H01S 3/08* (2006.01)
*H01S 3/11* (2006.01)
(Continued)

(52) U.S. Cl.
CPC ............ *H01S 3/08018* (2013.01); *H01S 3/0813* (2013.01); *H01S 3/1112* (2013.01); *H01S 3/027* (2013.01); *H01S 3/0604* (2013.01); *H01S 3/0805* (2013.01); *H01S 3/0811* (2013.01); *H01S 3/108* (2013.01); *H01S 3/1118* (2013.01); *H01S 3/1618* (2013.01); *H01S 3/1643* (2013.01)

(58) Field of Classification Search
CPC ............................ H01S 3/0813–3/0817; H01S 3/08018–3/0805; H01S 3/1112–3/1118
See application file for complete search history.

(56) References Cited

U.S. PATENT DOCUMENTS

| 6,363,090 B1 | 3/2002 | Wintner et al. | |
| 2002/0003440 A1* | 1/2002 | Qian et al. | 327/21 |

(Continued)

FOREIGN PATENT DOCUMENTS

WO 0143242 A1 6/2001

OTHER PUBLICATIONS

Aus Der Au et al., "16.2-W average power from a diode-pumped femtosecond Yb:YAG thin disk laser", Optics Letters, vol. 25, No. 11 pp. 859-861 (2000).

(Continued)

*Primary Examiner* — Joshua King
(74) *Attorney, Agent, or Firm* — Caesar Rivise, PC

(57) ABSTRACT

A laser device (100), configured for generating laser pulses, has a laser resonator (10) with a gain disk medium (11) and a Kerr medium (12). The laser resonator (10) includes a first mode shaping section (13) which is adapted for shaping a circulating electric field coupled into the gain disk medium (11), and a second mode shaping section (14), which is adapted for shaping the circulating electric field coupled into the Kerr medium (12) independently of the electric field shaping in the first mode shaping section (13). Furthermore, a method of generating laser pulses (1) using a laser resonator (10) with a gain disk medium (11) and a Kerr medium (12) is described.

23 Claims, 5 Drawing Sheets

(51) Int. Cl.
| | |
|---|---|
| H01S 3/081 | (2006.01) |
| H01S 3/108 | (2006.01) |
| H01S 3/16 | (2006.01) |
| H01S 3/02 | (2006.01) |
| H01S 3/06 | (2006.01) |

(56) References Cited

U.S. PATENT DOCUMENTS

2004/0095634 A1* 5/2004 Paschotta et al. ............. 359/330
2009/0168148 A1* 7/2009 Kondo et al. ................. 359/330
2009/0290606 A1 11/2009 Chilla et al.
2010/0177378 A1* 7/2010 Kondo et al. ................. 359/346

OTHER PUBLICATIONS

Baer et al., "Femtosecond thin-disk laser with 141 W of average power", Optics Letters, vol. 35., No. 13, pp. 2302-2304 (2010).
Bauer et al., "Energies above 30 μJ and average power beyond 100 W directly from a mode-locked thin-disk oscillator", Advanced Solid-State Photonics, OSA Technical Digest (CD) (Optical Society of America), paper ATμC2 (2011).
Ell et al., "Generation of 5-fs pulses and octave-spanning spectra directly from a Ti:sapphire laser", Optics Letters, vol. 26. No. 6, pp. 373-375 (2001).
Giesen et al., "Fifteen Years of Work on Thin-Disk Lasers: Results and Scaling Laws", IEEE Journal of Selected Topics in Quantum Electronics, vol. 13. No. 3, pp. 598-609 (2007).
Henrich et al., "Self-starting Kerr-lens mode locking of a Nd:YAG-laser", Optics Communications, vol. 135, pp. 300-304 (1997).
Hoenninger et al., "Ultrafast ytterbium-doped bulk lasers and laser amplifiers", Applied Physics B, vol. 69, pp. 3-17 (1999).
Ippen et al., "Passive mode locking of the cw dye laser", Appl. Phys. Lett., vol. 21, No. 8, pp. 348-350 (1972).
Koechner, "Solid-State Laser Engineering", Sixth Revised and Updated Edition, Springer (2006).
Laenen et al., "Kerr lens mode-locking of a sub-picosecond optical parametric oscillator", Optics Communications, vol. 115, pp. 533-538 (1995).
Lukishova et al., "Techniques for fabrication of multilayer dielectric graded reflectivity mirrors and their use enhancement of the brightness of the radiation from a multimode Nd3+:YAG laser with a stable cavity", Quantum Electronics, vol. 26, No. 11, pp. 1014-1017 (1996).
Magni, "Multielement stable resonators containing a variable lens", J. Opt. Soc. Am. A, vol. 4, No. 10, pp. 1962-1969 (1987).
Malcolm et al., "Self-mode locking of a diode-pumped Nd:YLF laser", Optics Letters, vol. 16. No. 24, pp. 1967-1969 (1991).
Marchese et al., "Femtosecond thin disk laser oscillator with pulse energy beyond the 10-microjoule level", Optics Express, vol. 16. No. 9, pp. 6397-6407 (2008).
Pronin et al., "Ultrabroadband efficient intracavity XUV output coupler", Optics Express, vol. 19, No. 11, pp. 10232-10240 (2011).
Saraceno et al., "High damage threshold SESAMs for high power femtosecond modelocking: 23 W, 235 fs Yb: LuScO3 thin-disk laser", Conference paper: The European Conference on Lasers and Electro-Optics (CLEO/Europe), Muenchen, Germany (2011).
Suedmeyer et al., "High-power ultrafast thin disk laser oscillators and their potential for sub-100-femtosecond pulse generation", Appl. Phys. B, vol. 97, pp. 281-295 (2009).
Tokurakawa et al., "Diode-pumped 65 fs Kerr-lens mode-locked Yb3+:Lu2O3 and nondoped Y2O3 combined ceramic laser", Optics Letters, vol. 33, No. 12, pp. 1380-1382 (2008).
Uemura et al., "Sub-40-fs Pulses from a Diode-Pumped Kerr-Lens Mode-Locked Yb-Doped Yttrium Aluminum Garnet Laser", Japanese Journal of Applied Physics, vol. 50, pp. 010201-1-010201-3 (2011).
International Search Report for PCT/EP2011/005023 dated Jun. 15, 2012.

* cited by examiner

LASER DEVICE WITH KERR EFFECT BASED MODE-LOCKING AND OPERATION THEREOF

FIELD OF THE INVENTION

The present invention relates to a laser device, which is configured for generating laser pulses, in particular to a femtosecond laser device including a gain disc medium and a mode-locking Kerr medium in a laser resonator. Furthermore, the invention relates to a method of generating laser pulses with a laser device, in particular generating femtosecond laser pulses using a laser resonator, which includes a gain disc medium and a mode-locking Kerr medium. Applications of the invention are present in the fields of laser technique, in particular in the fields of operating laser devices for measuring purposes, for material processing or as excitation sources for creating UV-, XUV- or X-radiation. Preferred applications of the invention are available e.g. in the field of operating high-power ultra-fast laser sources.

BACKGROUND OF THE INVENTION

In the present specification, reference is made to the following prior art of conventional pulse laser devices.
[1] A. Giesen et al. in "IEEE Journal of Electronics" vol. 33, 2007, p. 598;
[2] J. aus der Au et al. in "Opt. Lett." vol. 25, 2000, p. 859;
[3] C. R. E. Baer et al. in "Opt. Lett." vol. 35, 2010, p. 2302-2304;
[4] S. V. Marchese et al. in "Opt. Express" vol. 16, 2008, p. 6397-6407;
[5] D. Bauer et al. in "Advanced Solid-State Photonics", OSA Technical Digest (CD) (Optical Society of America, 2011), paper ATuC2.
[6] T. Südmeyer et al. in "Appl. Phys. B" vol. 97, 2009, p. 281-295;
[7] C. J. Saraceno et al. in "Conference Paper: The European Conference on Lasers and Electro-Optics (CLEO/Europe)" Munich, Germany, May 22, 2011;
[8] M. Tokurakawa et al. in "Opt. Lett." vol. 33, 2008, p. 1380-1382;
[9] C. Hönninger et al. in "Appl. Phys. B" vol. 69, 1999, p. 3;
[10] S. Uemura et al. in "Jpn. J. Appl. Phys." vol. 50, p. 010201;
[11] V. Magni et al. in "J. Opt. Soc. Am. A" vol. 4, 1987, p. 1962-1969;
[12] B. Henrich et al. in "Opt. Comm." vol. 135, 1997, p. 300-304;
[13] G. P. A. Malcolm et al. in "Opt. Lett." vol. 16, 1991, p. 1967;
[14] Walter Koechner, Textbook "Solid state laser engineering," $6^{th}$ rev. and updated ed. Springer 2010;
[15] S. G. Lukishova et al. in "Quantum Electronics" vol. 26, 1996, p. 1014;
[16] U.S. Pat. No. 6,363,090;
[17] E. P. Ippen et al. in "Appl. Phys. Lett." vol 21, 1972, p. 348; and
[18] O. Pronin et al. in "Opt. Express" vol. 19, 2011, p. 10232-10240

Thin disk technology for laser resonators overcame long standing milestone of achieving high average power directly from the laser. Multi-kW levels are obtainable directly from the laser with one disk head [1] in CW multimode, and more than 100 W in average power is available in fundamental mode operation. Due to the thermal management of the thin gain disk medium and as a consequence of reduced thermal lensing of the material, excellent beam quality and high power operation are possible simultaneously. This feature made the thin disk concept attractive for femtosecond lasers since about 2000 [2]. Gain media suitable for femtosecond thin disk operation are described in [6]. The most common gain media is Yb:YAG having benefits in terms of low quantum defect, high gain cross section, broad absorption line at 940 nm, high thermal conductivity, thermomechanical strength and availability in large sizes with good optical quality. Some other Yb doped materials have been used as well, like Yb tung-states: Yb:KYW, Yb:KLuW. Yb sesquioxides Yb:$Lu_2O_3$, Yb:$LuScO_3$, Yb: (Sc, Y, Lu)$_2O_3$ and Yb borates: YB:YCOB. These materials are attractive because of their broader emission bandwidth and therefore potentially shorter achievable pulses.

Power scaling experiments resulted in an average output power of 140 W obtained directly from the oscillator [3] and 10 μJ pulse energies from the cavity in which the disk is a one of the folding mirrors [4]. Moreover, 30 μJ output pulses have been obtained in the multipass cavity geometry [5]. However, in prior art it has been emphasized that pulse duration from Yb:YAG thin disk lasers is limited to about 700 fs [3, 6]. In [6] this limitation is related to the higher saturated gain and the reduced gain bandwidth due to a high inversion level at high power operation. The highest average power of ~140 W is reported from an Yb:$Lu_2O_3$ based thin disk oscillator with 735 fs pulses. However the emission bandwidth of this material should support pulses as short as 100 fs or even below as it has been demonstrated in [8]. So far the short pulses of 194 fs are achieved from a Yb:$LuScO_3$ thin disk laser with relatively low output power of 9.5 W [7]. Sub-100-fs-pulses have also been demonstrated from Yb:YAG gain medium by [10]. Nevertheless, spectral filtering had been applied and the wavelength was shifted from it's gain maximum at 1030 nm towards 1060 nm.

An early technique, which has been proposed historically far before the development of thin disk femtosecond lasers, includes the generation of ultra-short laser pulses by mode-locking of cw dye lasers [17]. Contrary to thin disk laser, the mode locking of dye lasers relied on the fast saturation dynamics of both the gain dye and saturable absorber dye, it does not need the initiation of the mode locking near the stability edge and cavity designs have small thermal load and small beam diameters over the cavity length. Femtosecond solid state thin disk laser relies on solution mode locking in the negative or positive dispersion regime. Moreover, Kerr lens mode locking includes very complex self focusing dynamics as well as complex cavity design. The complexity is caused by the analysis of the cavity behaviour near the stability edges which is necessary for reliable initiation of Kerr lens mode locking. Therefore cavity design and initiation of mode locking is much more complex task here compared with the dye laser techniques.

Thin disk femtosecond lasers can be operated on the basis of mode-locking using a Semiconductor Saturable Absorber Mirror (SESAM). The SESAM can be arranged as an end mirror in a cavity including concave resonator mirrors as schematically illustrated in FIG. 12 (prior art [2], see also [3]). According to FIG. 12, the conventional laser device 100' includes a laser resonator 10' with a gain disc medium 11' and a SESAM 18'. A resonator section 13' is provided for shaping the circulating electric field coupled into the gain disc medium 11'. The resonator section 13' is made of three concave mirrors, which allow the setting of a large mode size in the gain disc medium 11'. One of the three concave mirrors is a folding mirror which simultaneously influences the mode size in the SESAM 18'. Until now the shortest pulse duration generated from an SESAM mode locked Yb:YAG oscillator is 340 fs with 170 mW average power [9].

SESAMs have a number of benefits in terms of reduction of thermal lensing, insensitivity to the cavity alignment, and easy implementation in a resonator cavity by substitution of one of the flat mirrors. On the other hand, SESAMs have a number of drawbacks relating to Q-switching instabilities, low damage threshold, two photon absorption, thermal lensing resulting from saturable and non-saturable losses, finite relaxation time and limited supported bandwidth. In particular, the damage threshold of the semiconductor is lower than that of glass. Therefore the damage threshold of the SESAM sets a limitation in maximum achievable pulse energies and minimum achievable pulse durations inside the laser cavity. Furthermore, thermal lensing limits the average achievable power from the oscillator. Damage of the SESAM can also be partially caused by the heating of the device.

Power scaling in thin disk laser geometries is possible by increasing the mode area on the disk medium in proportion to the pump power (and by keeping the peak pump power at the same level). By utilizing this principle power scaling was successfully demonstrated in SESAM mode locked thin disk oscillators. However, both the thin disk pumped at high average power and the SESAM having saturable and non-saturable losses exhibit thermal lensing effects. As it was shown by Magni [11] one thermal lens inside the cavity results in two stability zones for operating the laser. Zone I is less and Zone II is much more sensitive to misalignment. The second stability zone corresponds larger beam sizes inside the cavity. Moreover enlarging the beam size in the cavity leads to shrinking of the stability zones. The width of the stability zones depends on the beam size as $\sim 1/w^2$ (w-beam waist in the disk). These features introduce more restrictions and make designing the cavity a more complex task. Evidently, including a second thermal lens (SESAM) in a cavity will make designing the cavity for fundamental mode operation even more complicated and narrow the stability zones even further.

Furthermore, thin disk femtosecond lasers can create laser pulses on the basis of mode-locking with a Kerr medium as schematically illustrated in FIG. 13 (Kerr lens mode-locking laser, KLM laser, see prior art [10], [12], [13], [16]). The conventional laser device 100' of FIG. 13 comprises a laser resonator 10' including a gain disc medium 11' and a mode-locking Kerr medium 12'. Furthermore, the laser resonator 10' includes two curved concave resonator mirrors, which span a resonator section 13' including the Kerr medium 12'. The circulating electric field in the laser resonator 10' coupled into the Kerr medium 12' is shaped in the resonator section 13' by the effect of the curved mirrors. The Kerr medium 12' is located in the focus formed by the curved mirrors and the gain disc medium 11' is used as a folding cavity mirror. Accordingly, the resonator section 13' simultaneously shapes the beam size in the gain disc medium 11'.

Due to the following disadvantages and restrictions, the resonator design of FIG. 13 is barely applicable in practice. Typically small beam sizes inside the cavity lead to the high risk of damaging of optical components. These effects are especially pronounced near the edges of the stability zones of the laser resonator. The beam waist in the gain disk medium 11' is strongly dependent on the beam waist in the Kerr medium 12' (the bigger the waist in the disk the smaller the waist in a Kerr medium). Accordingly, for larger spot sizes in the gain disk medium 11' such laser resonator 10' has to be completely redesigned and reoptimized. For the case of symmetric X shape cavity beam waist in the flat mirror $w_d$ related to the beam waist in the Kerr medium $w_k$ by ratio $w_d \sim f/w_k$.

Furthermore, cavity stability zones are strongly influenced by thermal lensing in thin disk and dispersive optics. Finally, the cavity length is strongly dependent on the large mode sizes in a cavity and Kerr medium.

At the moment, thin disk oscillators are the most promising way of achieving high powers and high energy pulses simultaneously from a compact table top system. But until now no thin disk laser generating emission-bandwidth-limited pulses or even beyond the emission-bandwidth-limit at high power level has been realized yet.

Generally, further cavity geometries are known in the field of solid state lasers. A laser resonator 10' can have e.g. a telescopic geometry or a concave-convex geometry as schematically illustrated in FIGS. 14A and 14B (prior art [14], page 248 and pages 219/221), resp. The telescope section 13' of FIG. 14A can be used to enlarge the spot size in the bulky gain medium 11'. The resonator providing the "concave-convex" geometry (FIG. 14B) is adapted for achieving a large mode size inside the laser resonator 10' as well. It is also known to use resonators combining concave-convex and telescopic geometries. However, the telescopic geometry and the concave-convex geometry have not yet been used in the field of mode-locked thin disk laser resonators.

Objective of the Invention

The objective of the invention is to provide an improved laser device being capable of avoiding disadvantages of conventional techniques. In particular, the laser device is to be capable of creating laser pulses with increased pulse energies and/or decreased pulse durations, in particular with a compact design having a large operation stability. Furthermore, the objective of the invention is to provide an improved method of creating laser pulses being capable of avoiding disadvantages of conventional techniques. In particular, the laser pulses are to be created with increased pulse energy and/or decreased pulse duration, in particular with large stability on a timescale of hours or more.

These objectives are solved by devices or methods comprising the features of the independent claims. Advantageous embodiments and applications of the invention are defined in the dependent claims.

SUMMARY OF THE INVENTION

According to a first general aspect of the invention, a laser device, in particular a pulse laser device, is provided, which is adapted for creating laser pulses. The laser device includes a laser resonator with multiple resonator mirrors, a gain disc medium, in particular a laser active disc medium, and a mode-locking Kerr medium.

According to the invention, the laser resonator includes a first mode shaping section, which is spanned by a first group (at least two) of the resonator mirrors and which is adapted for shaping the electric field (light field) coupled into the gain disc medium. According to the invention, the laser resonator additionally includes a second mode shaping section, which is spanned by a second group (at least two other) of the resonator mirrors and which is adapted for shaping the electric field (light field) coupled into the mode-locking Kerr medium. The resonator mirrors spanning the second mode shaping section are selected such that the circulating electric field is focused into the Kerr medium with the electric field having a predetermined beam waist in the Kerr medium.

The first and second mode shaping sections shape the beam diameter of the electric field circulating in the resonator (cavity). The first and second mode shaping sections comprise different sections of the resonator, wherein the gain disc medium is arranged inside or as a part of the first mode shaping section and the Kerr medium is arranged inside or as a part of the second mode shaping section. The electric field coupled into the gain disc medium is shaped independently of the shaping of the electrical field coupled into the Kerr medium. The first and second mode shaping sections are decoupled, i.e. they can be adjusted without influencing each other. Adjusting the first and second mode shaping sections in particular means the selection of the radii of curvature and/or the positions of the mirrors. If the beam size in the gain disc medium is changed using the first mode shaping section, this results in a vanishing or negligible change of the beam size in the Kerr medium adjusted by the second mode shaping section, and vice versa.

Preferably, the first mode shaping section provides a concave-convex cavity, a telescopic cavity or a superposition thereof. These cavity geometries have particular advantages for providing a power scalability, as they allow to set a large beam diameter not only at a single point like with the concave-concave geometry, but along the whole first mode shaping section.

Advantageously, the first and second mode shaping sections are configured for providing independent degrees of freedom for adjusting the beam diameter in the Kerr medium and in the gain disc medium, respectively. Furthermore, the first and second mode shaping sections allow an independent optimization of the sections with regard to thermal lens sensitivity and mode sizes on the mirrors.

According to a second general aspect of the invention, in terms of a method of the invention, a method of generating laser pulses is provided, wherein the laser pulses are created in a laser resonator including multiple resonator mirrors, a gain disc medium and a mode-locking Kerr medium. The electric field coupled into the gain disc medium is shaped, in particular is adjusted with respect to the beam diameter thereof, using a first group of resonator mirrors, which provide a first mode shaping section. According to the invention, the circulating electric field is additionally shaped using a second mode shaping section such that the beam diameter in the Kerr medium is adjusted independently of the beam diameter in the gain disc medium.

According to the invention, the independency of shaping the beam with the first and second mode shaping sections means a decoupling of the beam adjustment in the gain disc medium and in the Kerr medium, resp. Thus, in a first step of the inventive method, the cavity of the laser resonator is adjusted, e.g. as it is known in the conventional cavity adjustment of a continuous wave single mode laser. As examples, a telescopic cavity, a concave-convex cavity or a superposition thereof may be adjusted. In a second, subsequent step, the beam waist in the Kerr medium is adjusted using the second mode shaping section. The cavity design of the resonator and the function of the first mode shaping section are not influenced by the adjustment of the second mode shaping section. The second mode shaping section can be adjusted such that the whole resonator operates at an edge of a stability zone for resonant circulation of the electric field. Furthermore, by the effect of the Kerr medium, in particular by the effect of the Kerr lens, the whole resonator is brought back into the stability zone.

Advantageously, the inventors have found, that the inventive thin disk cavity design is capable to meet the following restrictions and considerations:
(a) small sensitivity to thermal lens of the gain disk medium and dispersive optics,
(b) ability of thermal compensation in cavity,
(c) small misalignment sensitivity of the cavity,
(d) large mode diameters in the gain disk medium approximately equal to the pump spot in the disk gain medium and large sizes over the cavity reduce nonlinear effects in air (especially critical for long cavities) and avoid damage of optics.

Furthermore, the following desirable conditions for Kerr lens cavity design are fulfilled for the first time:
(e) a certain (settable) beam size is provided in the Kerr medium, wherein this beam size can be varied to influence the focusing strength according to the approximation formula $f=w^2/(4n_2 I_0 L)$ (w is the beam waist, $n_2$ is the nonlinear index, $I_0$ is the peak intensity and L is the length of the Kerr medium),
(f) beam size variation further allows to provide certain amount of nonlinearity in the Kerr medium to achieve stable mode locking,
(g) cavity is most sensitive to Kerr effect near the stability edge. Typically KLM laser is operated near the one of the stability edges. Compromise between such operating point and reliable performance has been found with the invention.

As a main advantage, the invention allows a decoupling of the criteria (a-d) and the criteria (e-g) for stable Kerr lens mode locking. With the invention, an intrinsic scalability of power and energy of the laser pulses is obtained. Compared with conventional techniques, the pulse duration can be reduced and the average power of the laser device output can be increased. As an example, with an Yb:YAG gain disc medium, pulses of 190 fs with 15 W of average power have been obtained. To date these are the shortest ever generated from any thin disk oscillator. The inventive power/energy scaling concept is based on the independent adjustment of the beam size in the gain disc medium and the beam size in the Kerr medium allowing an independent optimization of the sections with regard to thermal lens effects. The second mode shaping section provides a beam waist scaling arrangement (magnifying or focusing arrangement) which is adjusted independently on the first mode shaping section, thus providing stable operation of the laser device at increased pump power.

Contrary to the SESAM-based creation of laser pulses as shown in FIG. 12, the invention avoids the limitations of mode-locking using a SESAM. On the other hand, contrary to the conventional Kerr lens based creation of laser pulses as shown in FIG. 13, the invention provides an additional degree of freedom for adjusting the beam size in the gain disc medium. It is an important result obtained by the present invention that the beam shaping of the conventional cavity, e.g. as shown in FIG. 12 or 13, can be applied together with the Kerr lens mode locking and provide stability as good as (or even better) conventional SESAM mode locking technique, however, in a cavity using mode-locking with a Kerr medium. Before the invention, it was expected that the laser resonator including the Kerr medium would be intrinsically unstable. It was expected that any additional imaging (magnifying or focusing) resonator section would result in an additional reduction of stability because of being operated closer to the resonator's stability edge. Surprisingly, the inventors have found that the stability of the inventive laser device is increased compared with the conventional techniques. The stability, which can be described with parameters like HF (high frequency) noise, fast absolute intensity fluctuations and/or slow intensity fluctuations has been found to be better than 3%. This represents an essential advantage compared with the conventional technique which has particular impact in terms of the application of the invention under practical conditions.

As a further particular advantage of the invention, the first mode shaping section allows a new design of the second mode shaping section adjusting the beam waist in the Kerr medium. Thus, according to a preferred embodiment of the invention, the second mode shaping section comprises the first group of resonator mirrors including at least two curved resonator mirror, which form a telescope. The second mode shaping section is a telescopic section imaging the circulating electric field into the Kerr medium. According to particularly preferred embodiments of the invention, the telescope section may comprise two concave mirrors or one concave and one convex mirror. In particular, a Newtonian or a Galilean telescope can be provided by the second mode shaping section. The telescope arrangement can be symmetric, i.e. the curved mirrors can have the same radii of curvature, or asymmetric, i.e. the curved mirrors have different radii of curvature. Furthermore, the telescope section can have different arm lengths and a distance between the mirrors spanning the telescope section which is selected depending on the resonator stability. As a further alternative, the second mode shaping section may comprise two concave resonator mirrors.

As a further advantage of the invention, the beam waist scaling arrangement (second mode shaping section) can be implemented in any thin disc resonator design. Depending on the cavity sensitivity to the Kerr effect and optional measures for influencing the Kerr effect, the second mode shaping section can be implemented in any cavity point. Thus, according to a further preferred embodiment of the invention, the Kerr medium can be arranged in the second mode shaping section, i.e. between the curved mirrors spanning the telescopic section or as an end mirror of the second mode shaping section. As an advantage, multiple degrees of freedom for adjusting the Kerr medium relative to the light path in the laser resonator can be obtained. Alternatively, the Kerr medium can be arranged outside of the second mode shaping section, in particular on a side of the telescope section opposite to the arrangement of the first mode shaping section within the laser resonator.

Furthermore, the arrangement of the first and second mode shaping sections relative to each other can be selected. With a first variant, the first and second mode shaping sections are arranged adjacent to each other along the light path in the laser resonator. Advantageously, this embodiment of the invention allows an easy independent adjustment of the beam sizes in the Kerr medium and the gain disc medium, respectively. According to a second variant, the second mode shaping section can be included in the first mode shaping section. As an advantage, this embodiment of the invention can provide a particularly compact resonator design.

The mode-locking Kerr medium generally comprises a solid optical element made of an optically non-linear material being capable of showing the Kerr effect. According to a preferred variant, the Kerr medium comprises a Kerr lens optical plate, which is arranged e.g. in a free-standing fashion in the optical path of the laser resonator. Advantageously, the free-standing plate can be freely adjusted relative to the light path. Alternatively, the Kerr medium may comprise a Kerr lens mirror, which is arranged as a folding mirror in the laser resonator. In this case, advantages in terms of avoiding thermal lensing effects can be obtained. In particular, the Kerr lens mirror can be provided in contact with a substrate, which forms a heat sink. Preferably, a bulky substrate with or without cooling, e.g. water cooling or electrical cooling, is used. On the substrate, the Kerr lens mirror comprises a reflective layer carrying the Kerr effect material. The Kerr lens mirror can be wedge-shaped or can have a plane-parallel shape, and/or it can be provided without or with an anti-reflective coating on the Kerr effect material.

As Kerr effect material, any available optically non-linear material showing the Kerr effect can be used. As a further advantage, in particular in combination with the combined use with a SESAM, the Kerr medium may comprise $CaF_2$, fused silica, sapphire or optical glass, like e.g. SF57 (tradename). Preferably, the optical path length of the Kerr medium along the laser resonator is below 6 mm, in particular below 1 mm. The optical path length practically used can be selected in dependency on the material of the Kerr medium.

According to a further preferred embodiment of the invention, the laser resonator can be provided with a semiconductor saturable absorber mirror (SESAM). According to this embodiment, the laser pulses are created using mode-locking with both of the Kerr medium and the SESAM. Advantageously, the SESAM can be used as a starter for the mode-locking operation. Preferably, the SESAM is arranged at an end of the laser resonator adjacent to the second mode shaping section and opposite relative to the first mode shaping section.

As a further advantageous feature of the invention, a gradient mirror can be provided in the laser resonator, which is configured as a hard aperture for the Kerr lens mode-locking. While hard aperturing may cause the heating of the laser resonator due to the high intra cavity average power, the gradient mirror, preferably having a Gaussian-like reflectivity profile can be used to provide similar losses. The gradient mirror can be provided as it is commonly used as an aperture for mode selection inside a high power oscillator (see [15]).

If, according to a further modification of the invention, the laser resonator is provided with a self starting device adapted for providing a self starting operation of the laser device, advantages in terms of a fast provision of the stable laser operation are obtained. Preferably, an acousto-optical modulator or a mechanical shaker can be used as a self starting device. Alternatively, the SESAM can be used as a mode-locking self starting device.

According to a further preferred embodiment of the invention, the laser resonator includes a spectral filtering or shaping unit, which is arranged for shifting a maximum gain wavelength and flattening a gain spectrum of the electric field (light field) circulating in the laser resonator. Flattened spectrum which is effectively broader allows generation of shorter pulses.

As a further advantage of the invention, the Kerr medium can be used for producing new spectral components in the electric field circulating in the laser resonator. The new spectral components are produced due to the optically non-linear effects inside the Kerr medium. As an advantage, the spectral properties of the laser pulses can be adjusted using in particular the Kerr medium.

Further advantages of the invention are obtained, if the temperature of at least of a part of the laser resonator is adjusted. Preferably, a temperature adjustment device is provided, which comprises e.g. a cooling device using a cooling liquid or an electric cooling effect. Accordingly, at least one of the gain disc medium, the Kerr medium, optionally the SESAM and further optionally the gradient mirror can be cooled, preferably to a temperature below −50° C. Advantageously, this cooling reduces thermal effects in the resonator operation. In particular, thermal effects can be compensated if a gradient cooling or heating of components of the laser resonator is provided.

Depending on the application of the laser device, additional components can be provided in the laser resonator. As an advantage, the improved stability of the inventive resonator design allows the introduction of additional media made of gaseous, liquid or solid materials. According to a first variant, an intracavity medium can be introduced which acts as a non-linear element for producing new spectral components in the electric field circulating in the laser resonator. As an example, a gas jet or a liquid jet can be provided in the laser resonator, wherein UV-, XUV- or X-radiation is created resulting from an interaction of the circulating laser pulses with the intracavity medium. Alternatively or additionally, an intracavity plate, e.g. a grazing incidence plate can be located along the light path in the laser resonator, wherein the intracavity plate is adapted as an output coupler for the new spectral components created in the laser resonator.

According to a further preferred feature, an evacuated box can be provided, which accommodates the complete laser resonator at a pressure reduced compared with the atmospheric pressure. Preferably, a vacuum can be created in the evacuated box. As an advantage, optical non-linearity and air perturbations can be reduced so that the stability of the laser device operation is further increased.

According to a further modification, the laser resonator can be combined with an external fibre broadening and compression stage. Advantageously, this combination allows a further adjustment of the pulse parameters, like pulse duration and pulse energy, using the broadening and compression stage. Furthermore, the laser pulses can be adapted with regard to the concrete application. Alternatively or additionally, an acousto-optical modulator can be provided, which is adapted for an external carrier-envelope-phase stabilization.

According to another preferred application of the invention, the laser resonator can be coupled with a passive enhancement cavity, which is configured for a coherent addition of laser pulses so that the pulse energy can be further increased. Alternatively, the laser resonator can be combined with an extra cavity non-linear crystal being arranged for a white light generation.

It is noted that the complete laser system including the laser device and the external fibre broadening and compression stage and/or the acousto-optical modulator as well as the combination of the laser device with a passive enhancement cavity and/or an extra cavity non-linear crystal represent additional subjects of the present invention.

BRIEF DESCRIPTION OF THE DRAWINGS

Further details and advantages of the invention are described in the following with reference to the attached drawings, which show in.

PREFERRED EMBODIMENTS OF THE INVENTION

Preferred embodiments of the invention are described in the following with particular reference to the design of the laser resonator, in particular the first and second mode shaping sections. Details of the optical components of the laser resonator, in particular the design of the reflective mirrors, the gain disc medium, the Kerr medium, a hard aperture and the optional SESAM are not described as far as they can be implemented as in conventional techniques. In particular, the techniques of pumping the gain disc medium are not described as they are known as such in prior art (see e.g. [1]). It is emphasized that the implementation of the invention is not restricted to the illustrated resonator geometries, but rather possible with any other types of laser resonators including at least one gain disc medium.

Figure 1:
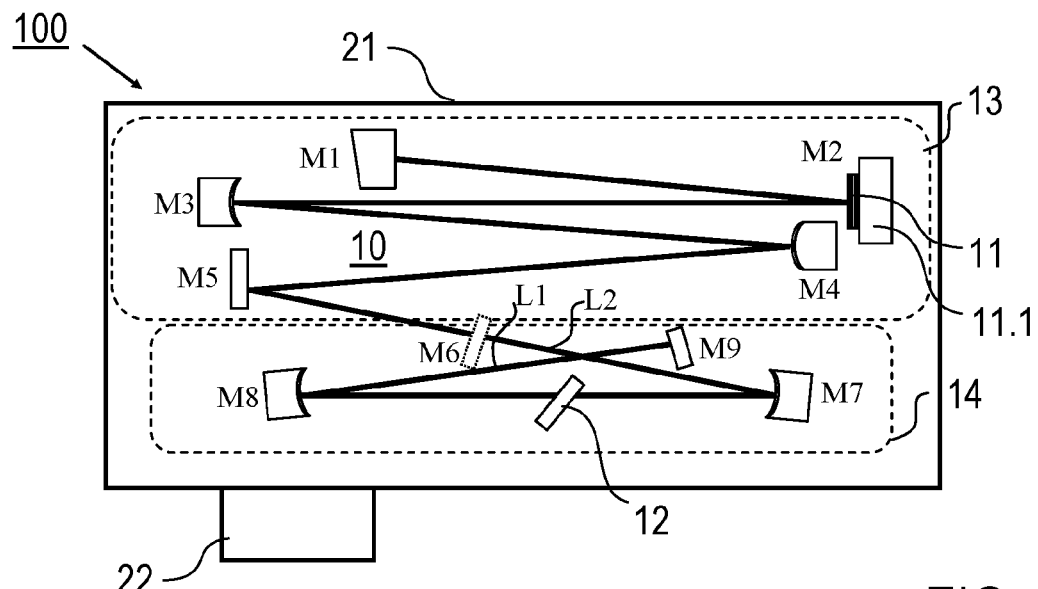
FIGS. 1 to 6: preferred embodiments of a laser device according to the invention.

FIG. 1 illustrates a first embodiment of an inventive laser device 100 with a laser resonator 10 including multiple resonator mirrors M1-M5 and M7-M9, wherein the mirror M2 is the gain disc medium 11. The resonator mirrors comprise flat or curved mirrors, at least one of which being provided with positive or negative group delay dispersion as it is known in the art. Furthermore, the laser resonator 10 includes a mode-locking Kerr medium 12. The laser resonator 10 comprises a first mode shaping section 13 and a second mode shaping section 14 highlighted by dashed lines. A normal hard aperture (not shown), e.g. in the form of a metal plate with a hole inside, can be implemented in the laser resonator 10, in particular in one of the first or second beam shaping sections 13, 14.

The first mode shaping section 13 is spanned between the mirrors M1 and M5 including the flat mirror M1, which is an output coupler of the laser resonator 10, the gain disc medium 11, curved mirrors M3 and M4 and a flat mirror M5 having a certain group delay dispersion. In the first mode shaping section 13, the laser beam size in the gain disc medium 11 is adjusted by the imaging properties of the mirrors M3 and M4 as well as the distances between mirrors in section 13 as it is known from conventional femtosecond oscillators.

Flat mirror M6 (shown with dotted line) is not provided in practice. It represents the end mirror of a conventional resonator. Contrary to the conventional resonator, the second mode shaping section 14 is coupled to the first mode shaping section 13 instead of the back reflection at the mirror M6.

The gain disc medium 11 is pumped with an external pump unit (not shown) which can be structured as it is known from prior art (see e.g. [1]). The gain disk medium is mounted to the cooling finger 11.1 and cooled in a way known from prior art [1]. The gain disc medium 11 is made of e.g. Yb:YAG, Yb:Lu$_2$O$_3$, Yb:KYW having a thickness of 50 to 250 μm.

The second mode shaping section 14 comprises two concave resonator mirrors M7 and M8 and a flat end mirror M9. The resonator mirrors M7 and M8 are concave mirrors having different or the same radii of curvature so that the electric field circulating along the beam path is focused in the Kerr medium 12. The Kerr medium 12 is preferably is located in the geometric center between the resonator mirrors M7 and M8. However, this is not necessary, a displaced arrangement can be implemented as well. The Kerr medium 12 is a free standing plate made of fused silica, CaF$_2$ or SF57 having a thickness of <6 mm. The flat end mirror M9 is a regular reflector or in an alternative embodiment a SESAM.

Reference numeral 21 schematically refers to an evacuated box accommodating the laser resonator 10. The box can be made of any pressure tight material, like plastics, including windows for outcoupling the laser pulses. As shown in FIG. 1, the box can be provided with the other embodiments described below, in particular with the embodiment of FIG. 8. Furthermore, reference numeral 22 schematically refers to a temperature adjustment device, allowing a temperature adjustment of the laser resonator or parts thereof.

Using the embodiment of FIG. 1, laser pulses are generated by resonant pumping the gain disk medium 11, so that a lasing light field is circulating in the laser resonator 10. The circulating field coupled into the gain disk medium 11 is exclusively sized in the first mode shaping section 13, while the circulating electric field coupled into the Kerr medium 12 is exclusively sized in the second mode shaping section 14. In order to start the Kerr lens mode-locking, the second mode shaping section 14 is adjusted to operate the laser resonator 10 at the edge of the stability zone. At the edge of the stability zone, the laser resonator 10 is particularly sensitive to the Kerr focusing effect. When the Kerr lens mode-locking starts, the laser resonator 10 returns closer to the stability center and operates stably. By the mode-locking Kerr effect of the Kerr medium 12, laser pulses are generated which are coupled out of the laser resonator 10 through the mirror M1.

Figure 2:
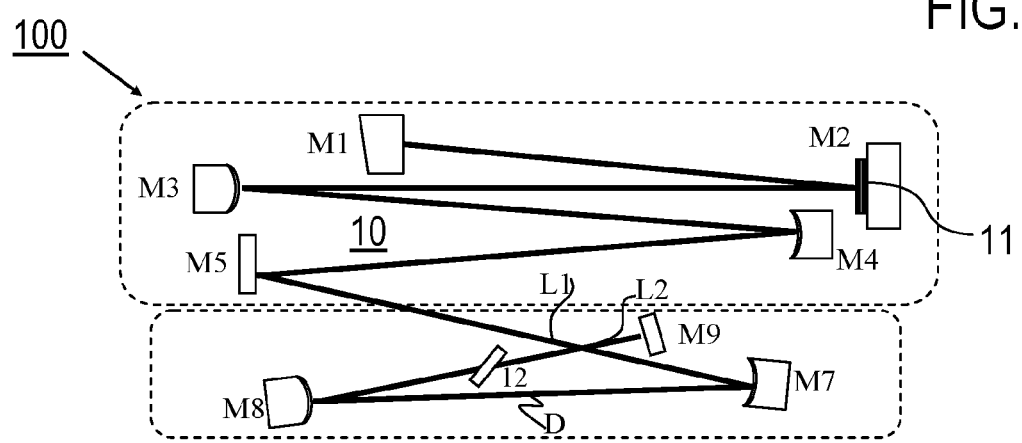

The position of the Kerr medium 12 is not necessarily at a location between the curved mirrors of the second mode shaping section 14. The Kerr medium 12 can be located outside the curved mirrors of the second mode shaping section 14 as it is schematically illustrated in FIG. 2. With this embodiment, the inventive laser device 100 comprises a laser resonator 10 with the resonator mirrors M1-M5 and M7-M9 as described above. The second mode shaping section 14 includes a concave reflector mirror M7 and a convex reflector mirror M8. The Kerr medium 12 is arranged between the reflector mirror M8 and the end mirror M9. The mirrors M7 and M8 adjust the beam size in the Kerr medium 12. The embodiment of FIG. 2 may have advantages in terms of the spatial requirements for positioning and adjusting the Kerr medium 12.

Figure 3:
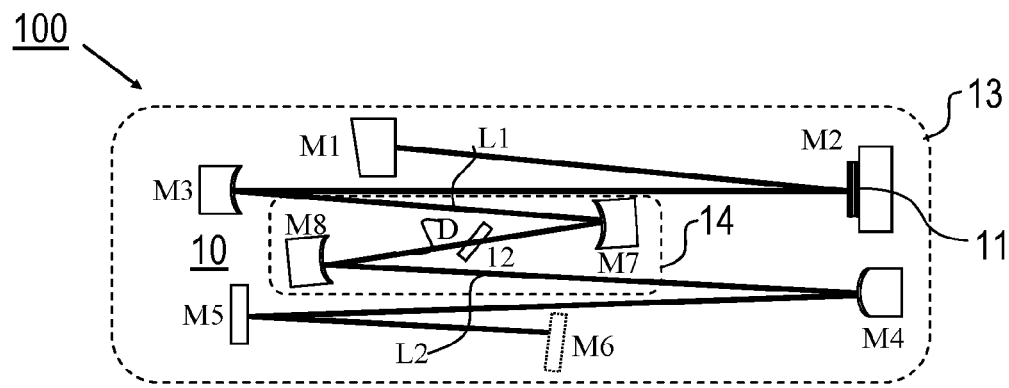

FIG. 3 shows another embodiment of the inventive laser device 100 comprising a laser resonator 10 with resonator mirrors M1-M8, wherein the second mode shaping section 14 is included in the first mode shaping section 13. In other words, the beam waist scaling arrangement for adjusting the beam in the Kerr medium 12 is implemented inside of the main cavity. In order to avoid an influence in the main cavity, the second mode shaping section 14, comprising a Newtonian or Galilean telescope, can be focused to infinity (4f extension telescope). With the embodiment of FIG. 3, the flat mirror M1 represents the output coupler. The mirror M2 is the gain disc medium 11. The concave and convex resonator mirrors M3 and M4 belong to the first mode shaping section 13 adjusting the beam size in the gain disc medium 11. Resonator mirror M5 is a flat mirror introducing a certain dispersion into the laser resonator 10, and resonator mirror M6 is a flat end mirror or SESAM. The second mode shaping section 14 is provided by the concave reflector mirror M7 having a first radius R1 of curvature and the second concave resonator mirror M8 having a second radius R2 of curvature. The Kerr medium 12 is arranged in the beam path between mirrors M7 and M8.

Figure 4:
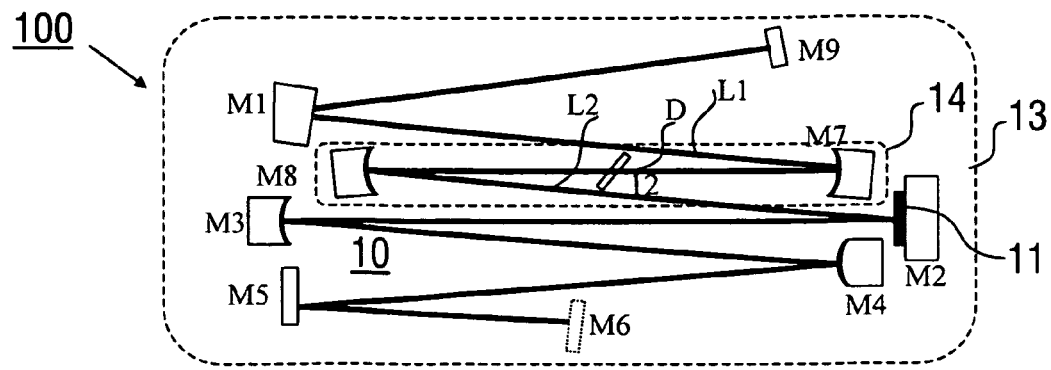

FIG. 4 illustrates a further embodiment of the laser device 100, which is similar to the embodiment of FIG. 1. With this embodiment, the laser resonator 10 includes resonator mirrors M1-M9, wherein the resonator mirrors M1-M6 and M9 provide the first mode shaping section 13 and the resonator mirrors M7 and M8 provide the second mode shaping section 14. Flat resonator mirror M1 is the output coupler. The resonator mirror M2 is the gain disc medium 11. Concave and convex resonator mirrors M3 and M4 are a telescopic arrangement, which is provided for adjusting the beam size in the gain disc medium 11. Resonator mirror M5 is a flat mirror with a certain dispersion, and resonator mirror M6 is a flat mirror or a high reflector or a SESAM. The second mode shaping section 14 is provided by the concave mirrors M7 and M8 having radii R1, R2, respectively, of curvature.

Figure 5:
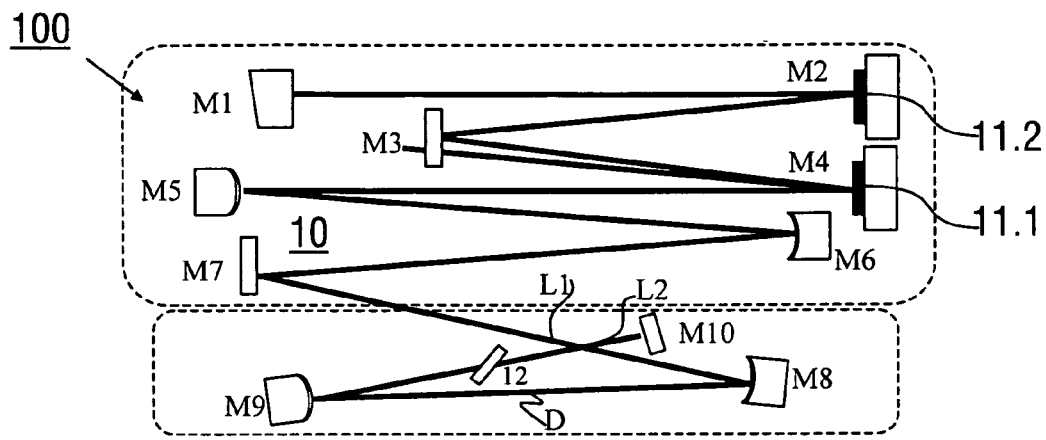

According to modifications of the invention, the gain disc medium 11 can be modified compared with the flat geometry shown in FIGS. 1 to 4. Firstly, the gain disc medium does not necessarily have a flat surface, but it can be provided with a convex or concave surface and therefore used as one of the curved resonator mirrors in the first mode shaping section, in particular with the "concave-convex" cavity or in a telescopic design. Furthermore, multiple thin disc heads 11.1, 11.2 (two or more than two) can be provided in the laser resonator, as shown in FIG. 5 representing an embodiment similar to the embodiment of FIG. 2.

Figure 6:
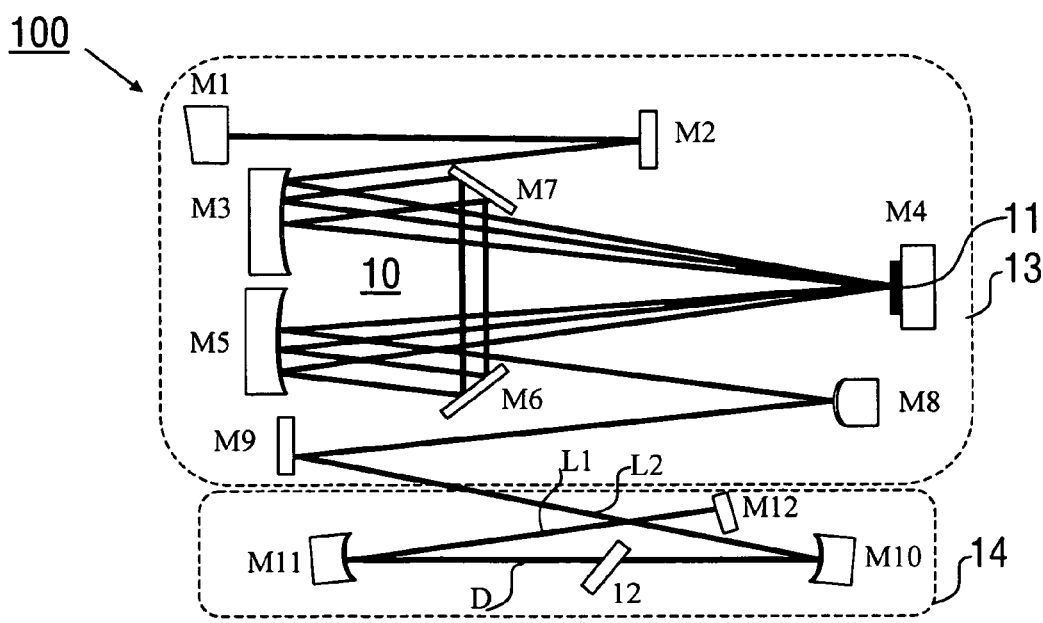

FIG. 6 schematically illustrates the power scaling capability of the inventive laser device 100 by implementing a multi path geometry. In this case, the laser resonator 10 comprises resonator mirrors M1-M11, wherein the resonator mirrors M1-M9 span the first mode shaping section 13 and the resonator mirrors M10-M12 span the second mode shaping section 14. In the first mode shaping section 13, resonator mirror M1 is the output coupler, and resonator mirror M4 is the gain disc medium 11. Resonator mirrors M3, M5 and M8 are curved mirrors, while resonator mirrors M2, M6 and M9 are flat mirrors having a certain dispersion. With the mirrors M2, M3 and M5-M8, the multi path geometry is provided. It is noted that the illustration in FIG. 6 represents a schematic example only. According to the invention, other multi path geometries can be realized.

In FIG. 6, the second mode shaping section 14 is provided as shown in FIG. 1. It comprises the telescopic mirrors M10 and M11 and the flat mirror, high reflector or SESAM M12. The Kerr medium 12 is arranged between the curved resonator mirrors M10 and M11.

Figure 7:
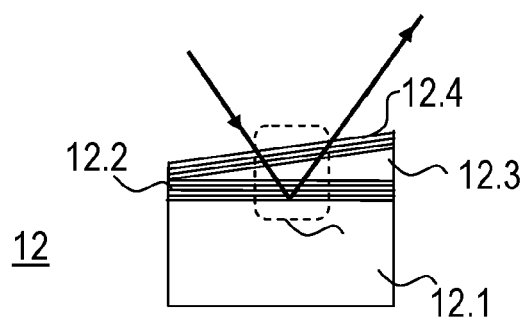
FIG. 7: a schematic illustration of a Kerr lens mirror used as a Kerr medium.

FIG. 7 schematically illustrates a Kerr lens mirror 12, which can be used with the inventive laser device instead of the free standing Kerr plate. The Kerr lens mirror 12 comprises a substrate 12.1 carrying a first high reflective (HR) coating 12.2, the Kerr lens medium 12.3 and a second anti-reflective (AR) coating 12.4. Due to the contact of the Kerr lens medium 12.3 with the substrate 12.1, thermal effects in the Kerr lens medium 12.3 can be avoided. Materials with higher thermal conductivity like sapphire or diamond can also be considered a potential candidate. As an advantage, very thin plates having a thickness below μm contacted to the substrate 12.1 can be used.

The Kerr lens mirror 12 works in reflection. It can be implemented at any position inside the laser resonator having the necessary sensitivity to the Kerr effect.

Figure 8:
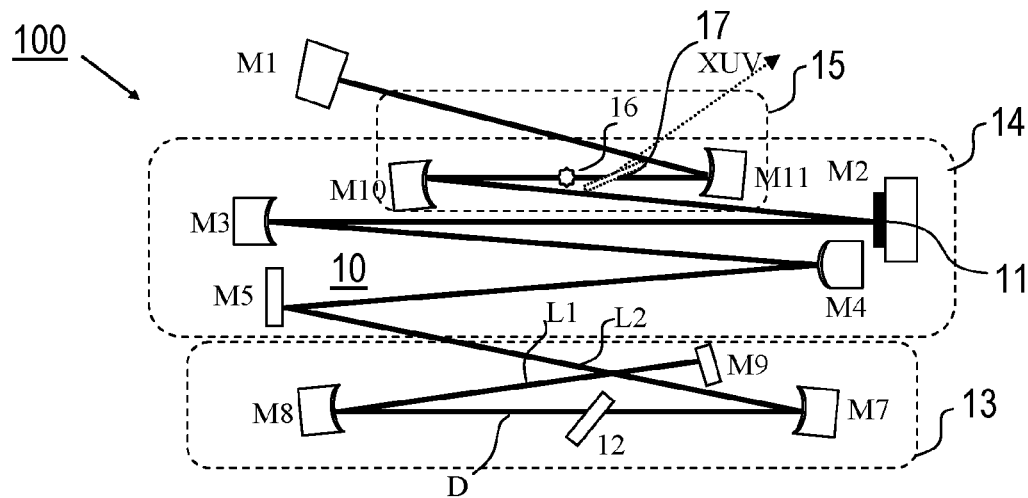
FIG. 8: a further preferred embodiment of a laser device according to the invention including an intracavity medium.

FIG. 8 illustrates a further embodiment of the inventive laser device 100, which is adapted for an XUV generation inside the femtosecond oscillator cavity. With regard to the first and second mode shaping sections 13, 14, the laser resonator is structured as described above with reference to FIG. 1. Additionally, a third mode shaping section 15 is provided, which includes an intracavity medium 16 comprising a gas jet. The intra cavity medium 16 is positioned in the focus between the curved mirrors M10 and M11 of the third mode shaping section 15. XUV radiation is generated as a result of the interaction of circulating laser pulses with the intracavity medium 16. The XUV radiation is coupled out of the laser resonator 10 using a Brewster plate or a grazing incidence plate 17 arranged at certain angle relative to the light path in the laser resonator 10 (see [18]). At least the third mode shaping section 15 is provided in an environment of reduced pressure, like e.g. the box 21 as shown in FIG. 1.

Figure 9:
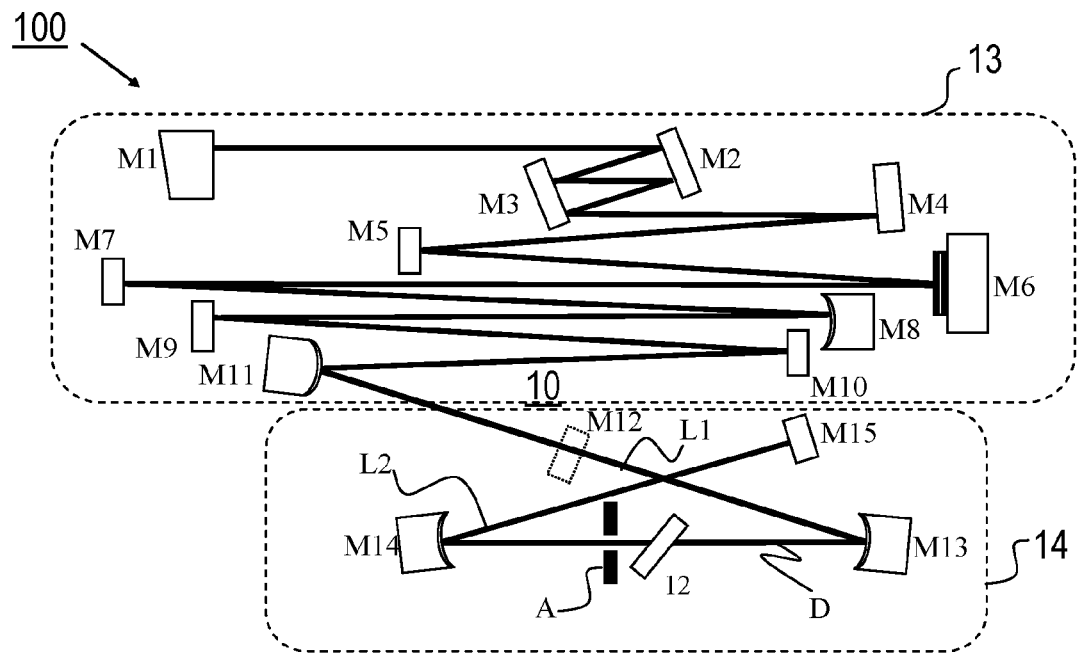
FIG. 9: a further preferred embodiment of a laser device according to the invention.

A further embodiment of the inventive laser device 100 is illustrated with more details in FIG. 9. The laser resonator 10 comprises the first mode shaping section 13 including the resonator mirrors M1-M11 and the second mode shaping section 14 including the resonator mirrors M13-M15.

The first mode shaping section 13 is a standing wave thin disc cavity which would be closed with an end mirror M12 or SESAM (shown with dotted line) in a conventional laser device. In the inventive laser device, the end mirror M12 is not provided, mirror M15 works as end mirror. Resonator mirror M1 is an output coupler, resonator mirrors M2-M5 and M8, M9 and M11 are flat high reflective chirped mirrors. Negative group delay dispersion introduced by these mirrors is about −22000 $fs^2$.

The second mode shaping section 14 is a Newtonian telescope which is slightly asymmetric with L1=R2=150 mm and L2=200 mm, a distance D between the mirrors M13 and M14 which is approximately equal D=R. Even asymmetric Newtonian telescope does not significantly influence the cavity arrangement in the first mode shaping section 13.

The distances between the mirrors are (in mm): M1-M2: 265, M2-M3: 85, M3-M4: 150, M4-M5: 185, M5-M6: 425, M6-M7: 640, M7-M8: 250, M8-M9: 220, M9-M10: 280, M10-M11: 205, M11-M13: 380, M13-M14: 310, M14-M15: 200.

The gain disc medium 11 is provided by the resonator mirror M6. It includes a 220 μm thick wedged Yb:YAG disc with Yb doping concentration of 7%. A pump module (not shown, manufacturer: Dausinger & Giesen GmbH, Germany) is aligned for 24 passes through the gain disc medium 11 and a pump spot diameter of 3.2 mm. The Yb:YAG thin disc is used as one of the folding mirrors (M6) in the first mode shaping section 14 and pumped by a fibre coupled diodes centered at 940 mm wavelength.

With the above geometry, the first mode shaping section 13 represents a thin disc cavity with overall large mode sizes: The beam waist (radius) in the gain disc medium 11 is 1.3 mm, while the beam waist in a M12 or SESAM is around 1 mm. The average beam waist in the cavity is around 2.6 mm.

The second mode shaping section 14 is implemented to provide the necessary beam size in the Kerr medium 12. With the Newtonian telescope (4f extension), the distance D is approximately equal to R=300 mm (e.g. D=305 mm in order to operate close to the stability edge). The Kerr medium 12 is a 1 mm thick fused silica plate situated at the Brewster angle inside the 4f extension.

The laser device 100 is operating at the stability edge corresponding to the increased distance D between the mirrors M13 and M14. This stability edge is chosen in order to provide soft gain aperture mode locking and hard aperture mode locking.

Figure 10:
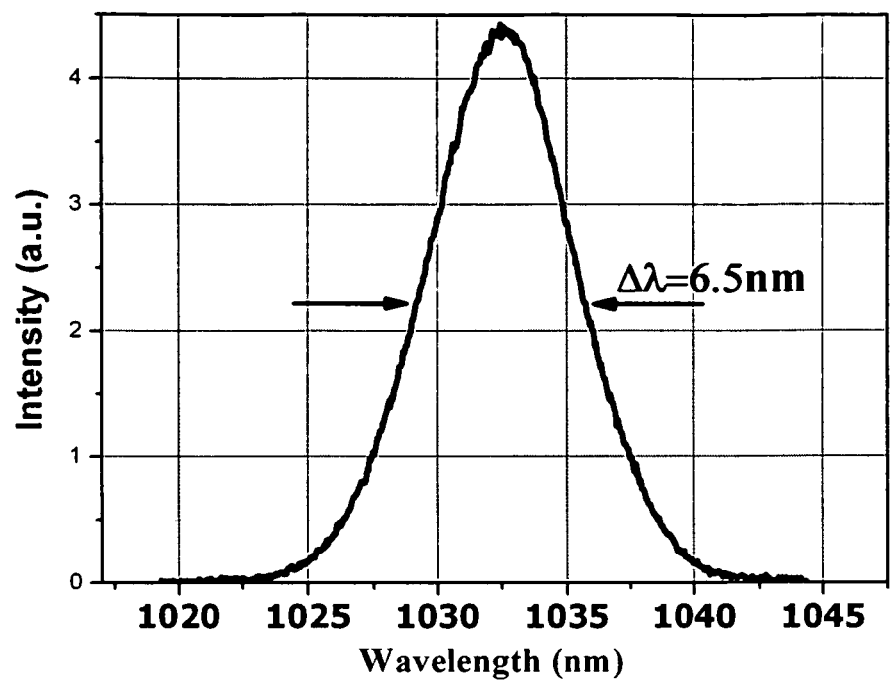
FIGS. 10 and 11: diagrams illustrating experimental results obtained with the laser device according to the invention.
Figure 11:
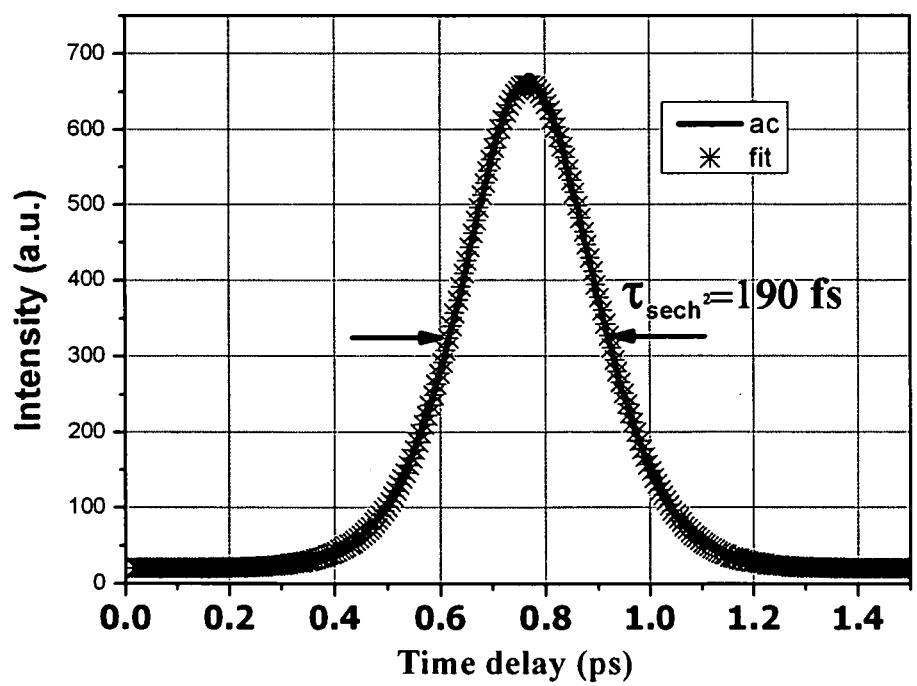
Figure 12:
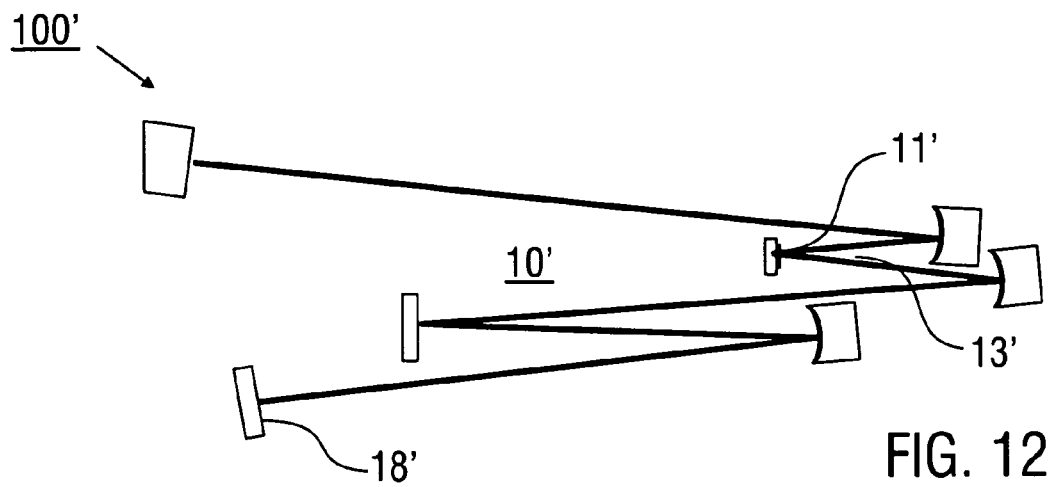
FIGS. 12, 13 and 14: schematic illustrations of conventional laser resonators (prior art).
Figure 13:
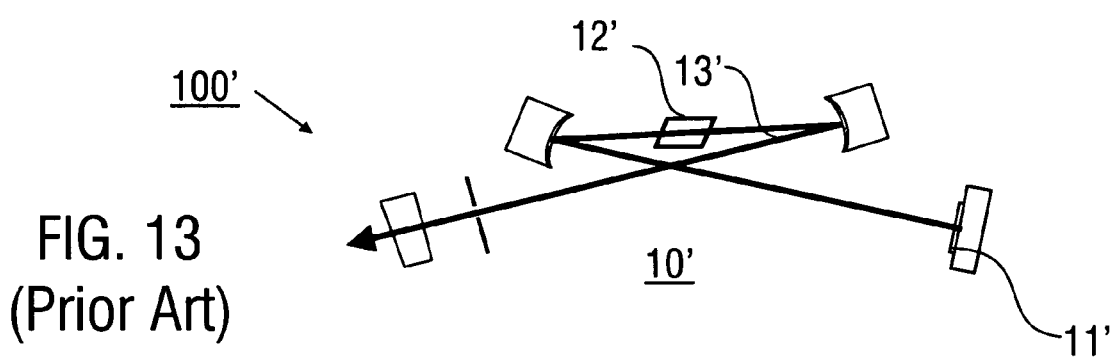
Figure 14:
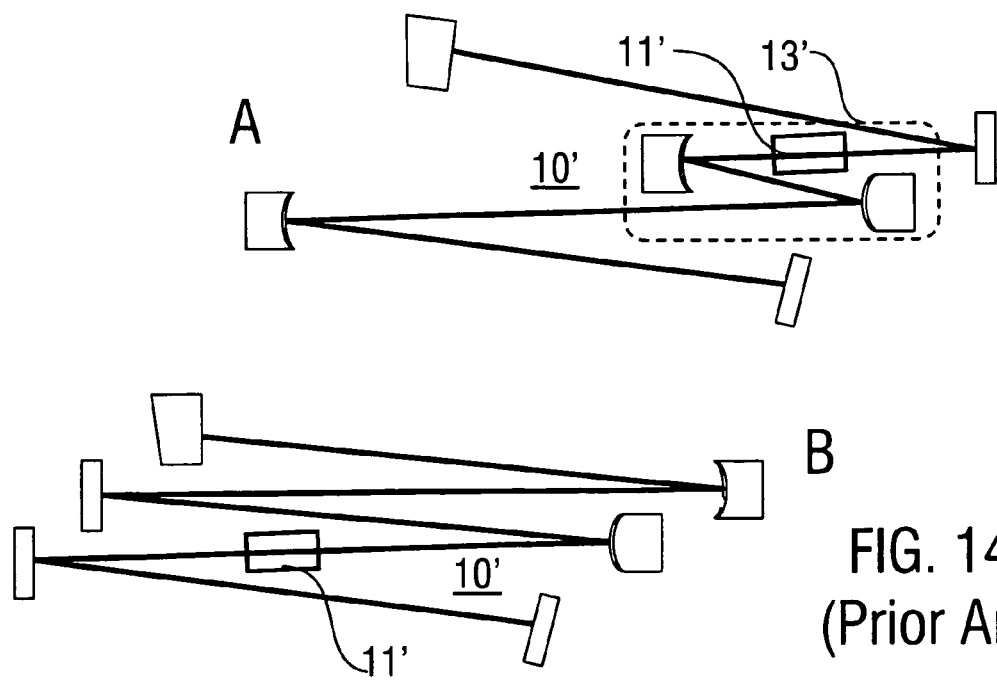

FIGS. 10 and 11 illustrate experimental results obtained with the laser device 100 of FIG. 9. FIG. 10 illustrates a spectrum measured at an output power of 15 W and a pump power of 150 W with an output coupler transmission of 5.5%. Furthermore, FIG. 11 illustrates the autocorrelation measurement, which results in a measured pulse duration of about 190 fs.

The features of the invention disclosed in the above description, the drawings and the claims can be of significance both individually as well as in combination for the realisation of the invention in its various embodiments.

The invention claimed is:

1. A laser device including a laser resonator, the laser resonator comprising:
   a first mode shaping including multiple resonator mirrors which have a telescopic geometry including a combination of at least one convex resonator mirror and at least one concave resonator mirror, a concave-convex geometry or a superposition thereof, and which has a thin disk laser medium providing one of the multiple resonator mirrors, said first mode shaping section is for adjusting a beam diameter of a circulating electric field in the thin disk laser medium, and
   a second mode shaping section which includes a Kerr medium, the second mode shaping section is for adjusting the beam diameter of the circulating electric field in the Kerr medium, wherein the first and second mode shaping sections are for adjusting the beam diameters of the circulating electric field in the thin disk laser medium and in the Kerr medium independently of each other.

2. Laser device according to claim 1, wherein
   the first and second mode shaping sections are adjacently arranged along a light path in the laser resonator, or
   the second mode shaping section is arranged inside the first mode shaping section.

3. Laser device according to claim 1, wherein
   the second mode shaping section comprises a telescope with two curved resonator mirrors including a combination of at least one convex resonator mirror and at least one concave resonator mirror, or
   the second mode shaping section comprises two concave resonator mirrors.

4. Laser device according to claim 1, wherein
   the second mode shaping section comprises a Newtonian or a Galilean telescope with two curved resonator mirrors.

5. Laser device according to claim 1, wherein
   the Kerr medium is arranged in the second mode shaping section, or
   the Kerr medium is arranged outside of the second mode shaping section in opposite relationship relative to the first mode shaping section.

6. Laser device according to claim 1, including at least one of the features
   the Kerr medium comprises a Kerr lens optical plate or a Kerr lens mirror,
   the Kerr medium is made of $CaF_2$, fused silica, sapphire or glass, and
   the Kerr medium has an optical path length below 6 mm.

7. Laser device according to claim 1, wherein the laser resonator further includes at least one of
   a hard aperture,
   a linear (passive) gradient mirror operating as an aperture for mode-locking in the Kerr medium, and
   a self starting device adapted for providing a self starting operation of the laser device, and
   a spectral filtering or shaping unit arranged for shifting of a maximum gain wavelength and flattening gain spectrum of the electric field circulating in the laser resonator.

8. Laser device according to claim 1, wherein
   the Kerr medium is arranged for producing additional spectral components in the electric field circulating in the laser resonator.

9. Laser device according to claim 1, further including at least one of
   an intracavity medium acting as a nonlinear element for producing additional spectral components in the electric field circulating in the laser resonator, and
   an intracavity plate acting as an output coupler for new spectral components created in the laser resonator.

10. Laser device according to claim 1, further comprising at least one of
    an evacuated box accommodating the laser resonator at reduced pressure or in vacuum,
    an external fibre broadening and compression stage, and an acousto-optical modulator being adapted for external carrier envelope phase stabilization.

11. Laser device according to claim 1, wherein
the laser resonator is coupled with a passive enhancement cavity or with an extra cavity nonlinear crystal for white light generation.

12. A method of generating laser pulses using a laser resonator with a thin disk laser medium and a Kerr medium, said method comprising the steps of
adjusting a beam diameter of a circulating electric field in the thin disk laser medium in a first mode shaping section including multiple resonator mirrors, wherein the thin disk laser medium is providing one of the multiple resonator mirrors, and
adjusting the beam diameter of the circulating electric field coupled into the Kerr medium in a second mode shaping section, wherein,
the beam diameter of the circulating electric field in the first mode shaping section is adjusted by using a telescopic geometry including a combination of at least one convex resonator mirror and at least one concave resonator mirror, resonator mirrors having a concave-convex geometry, or a superposition of the telescopic geometry, or a superposition of the telescopic geometry and the concave-convex geometry, and
the beam diameters of said circulating electric field in the thin disk laser medium and in the Kerr medium are adjusted independently of each other.

13. Method according to claim 12, wherein the shaping of the circulating electric field in the second mode shaping section is obtained by using
a telescope with two curved resonator mirrors including a combination of at least one convex resonator mirror and at least one concave resonator mirror, or
two concave resonator mirrors.

14. Method according to claim 12, wherein the shaping of the circulating electric field in the second mode shaping section is obtained by using
a Newtonian or a Galilean telescope with two curved resonator mirrors.

15. Method according to claim 12, wherein
the Kerr medium is arranged in the second mode shaping section, or
the Kerr medium is arranged outside of the second mode shaping section in opposite relationship relative to the first mode shaping section.

16. Method according to claim 12, wherein the laser resonator further includes at least one of
a hard aperture,
a linear (passive) gradient mirror operating as an aperture for mode-locking in the Kerr medium, and
a self starting device adapted for providing a self starting operation of the laser device.

17. Method according to claim 12, further comprising
spectral filtering of the circulating electric field for shifting of a maximum gain wavelength and flattening gain spectrum.

18. Method according to claim 12, further comprising at least one of
producing new spectral components in the electric field circulating in the laser resonator using the Kerr medium or an intracavity medium,
out-coupling of new spectral components from the laser resonator using the Kerr medium or an intracavity plate, and
coupling the laser resonator with a passive enhancement cavity or with an extra cavity nonlinear crystal for white light generation.

19. Method according to claim 12, further comprising
out-coupling of new spectral components from the laser resonator using the Kerr medium or an intracavity plate.

20. Method according to claim 12, further including
adjusting the temperature at least of a part of the laser resonator.

21. Method according to claim 12, further comprising at least one of
arranging the laser resonator in an evacuated box at reduced pressure or in vacuum,
coupling the laser resonator with an external fibre broadening and compression stage, and
an external carrier envelope phase stabilization using an acousto-optical modulator.

22. Method according to claim 12, further comprising at least one of
arranging the laser resonator in an evacuated box at reduced pressure or in vacuum,
subjecting the laser pulses created in the laser resonator to an external fibre broadening and compressing, and
subjecting the laser pulses created in the laser resonator to an external carrier envelope phase stabilization using an acousto-optical modulator.

23. Method according to claim 12, further comprising
coupling the laser resonator with a passive enhancement cavity or with an extra cavity nonlinear crystal for white light generation.

* * * * *